(12) United States Patent
Fontan

(10) Patent No.: US 6,698,556 B1
(45) Date of Patent: Mar. 2, 2004

(54) CURVED BRAKE PAD

(76) Inventor: Joe Luis Fontan, 43994 Cobham, Ashburn, VA (US) 20147

( * ) Notice: Subject to any disclaimer, the term of this patent is extended or adjusted under 35 U.S.C. 154(b) by 0 days.

(21) Appl. No.: 09/118,973

(22) Filed: Jul. 20, 1998

(51) Int. Cl.$^7$ ................................................ F16D 69/00
(52) U.S. Cl. ................ 188/259; 188/250 B; 188/250 R
(58) Field of Search .................... 188/259, 73.1, 188/250 B, 250 R, 24.11, 24.12, 24.13, 24.19, 24.21, 24.22, 250 G

(56) References Cited

U.S. PATENT DOCUMENTS

| | | | | |
|---|---|---|---|---|
| 3,412,835 A | * | 11/1968 | Goldberg | .................. 188/259 |
| 3,430,738 A | * | 3/1969 | Dain et al. | .................. 188/259 |
| 4,676,347 A | * | 6/1987 | Rees | ...................... 188/250 B |
| 5,231,861 A | * | 8/1993 | Tokumura et al. | ...... 188/250 G |
| 5,499,705 A | * | 3/1996 | Ide | .............................. 188/259 |

FOREIGN PATENT DOCUMENTS

| | | | |
|---|---|---|---|
| DE | 2439631 B | * | 2/1976 |
| JP | 08135698 A | * | 5/1996 |

* cited by examiner

*Primary Examiner*—Jack Lavinder
*Assistant Examiner*—Mariano Sy

(57) ABSTRACT

The curved brake pad is a flexible brake pad, curved in design, which does not come in constant contact with its rotating disk when not in use. The gap between the curved pad and the disk reduces the amount of friction and heat generated by the constant rotation. This reduced friction and reduced heat improves fuel efficiency and improves the braking performance of the system.

1 Claim, 1 Drawing Sheet

CURVED BRAKE PAD

CROSS REFERENCE TO RELATED APPLICATIONS

Not Applicable.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

Most vehicles, on or off road, utilize a form of disk brakes for their deceleration. The disk brake system incorporates a flat rotating disk aligned with the vehicle's axles. Two or more flat pads lay against the disk. When braking is desired the pads are pressed tight against the rotating disk and cause it to slow its rotation, and hence the vehicle slows down. During braking, these pads are pressed against the disk either hydraulically or pneumatically through mechanical devices called calipers.

This current traditional or "flat" brake pad system has several drawbacks. The pads lie flat against the disks and are therefore in constant contact with it. This contact generates constant friction, even when it is not needed. The friction must be counteracted by the vehicle's engine and therefore reduces fuel efficiency. The friction also generates high amounts of heat. This heat is detrimental to the brake's effectiveness by reducing the overall braking energy of the system.

BRIEF SUMMARY OF THE INVENTION

This invention, by its design, would counteract all of the above disadvantages of the current disk brake system. Basically the "CURVED BRAKE PAD" is a brake pad that is flexible and slightly curved in the middle. The curved brake pad does not come in total contact with the rotating disk. It simply touches the disk on each of the ends. The curved pad is made of a pliable material which would bend flat and come in whole contact with the disk when needed but flex back to its curved position when the caliper pressure was removed. Since the curved pad is not in constant contact with the rotating disk, it does not generate the high friction that a traditional "flat" pad does. This reduced friction would yield higher fuel economy for the vehicle and less wear for the pad therefor requiring fewer replacements. The reduced friction would also generate less heat. The cooler operating temperature would give the system better braking capability through a higher braking energy.

DETAILED DESCRIPTION OF THE INVENTION

Figure 2:
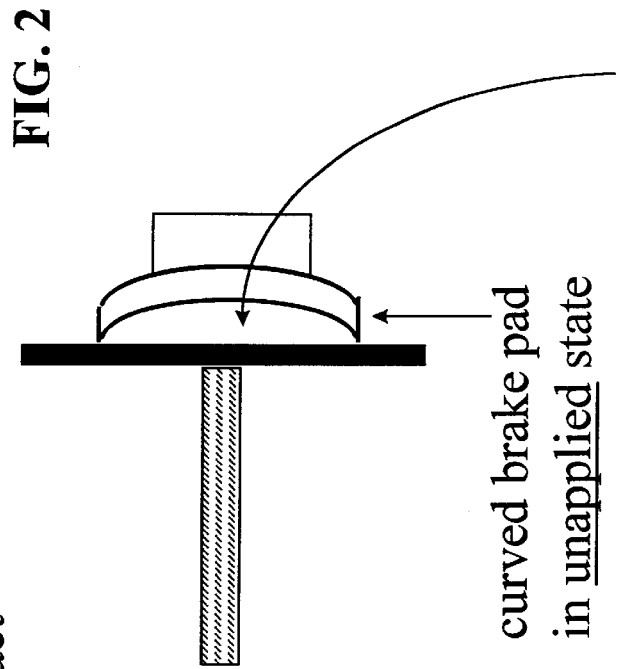
FIG. 2 is a top view of the "curved" pad system in an unapplied state. Note that the pads are not in total contact with the rotating disk.
Figure 1:
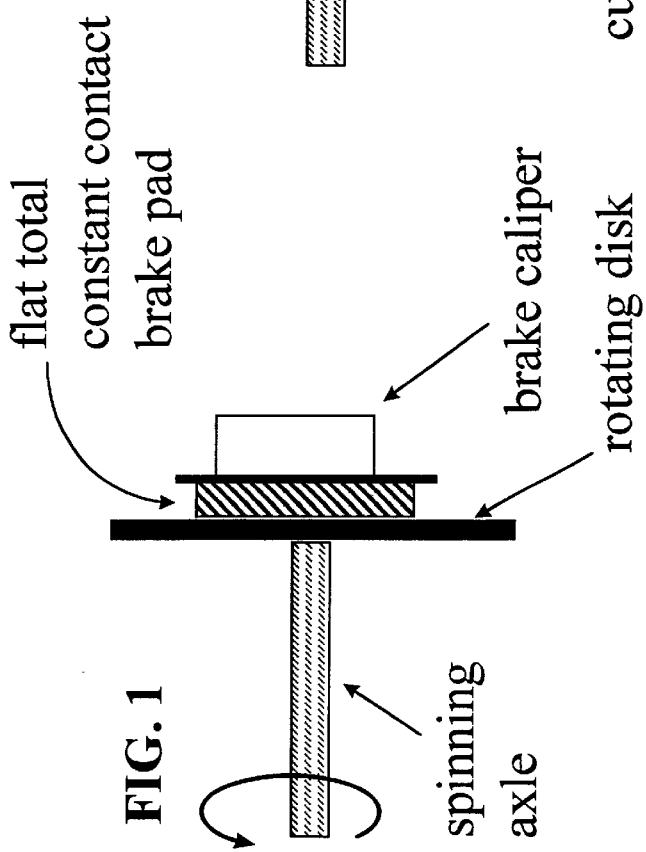
FIG. 1 is a top view of a traditional "flat" pad system in an unapplied state. It is also a top view of the same system with brakes applied. (Very little difference between the two, hence its inefficiency)

In FIG. 2 we see that the curved brake pads touch the brake disk only on its front and rear edges. This is required in order to eliminate disk vibration and any other loose operation of the system. The gap in between is the area of the curved pad that does not generate friction or heat. The lack of friction allows the vehicle to be more fuel-efficient. The lack of heat allows the brake to run cooler and therefor be ready to give a higher amount of brake energy when asked to decelerate the vehicle.

Figure 3:
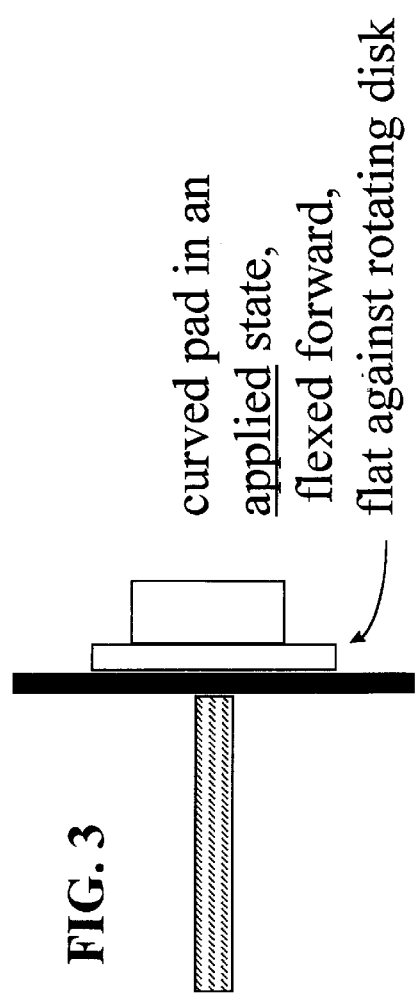
FIG. 3 is a top view of the "curved" pad system with the brakes applied. Note that the pads have flexed flat against the disk.

In FIG. 3 we see the curved pad being put to work by the calipers and flexing forward to grip the rotating disk. Since they are not held in constant friction, the pad and the disk would be at a cooler temperature. When the brakes are applied, the curved pad flexes flat against a cooler disk and therefor generates a higher degree of friction and deceleration. After the desired deceleration is achieved, the flexible curved pad returns to its original curved position. This pliability is achieved by having the pad made from a flexible type of composite mixed with an asbestos like compound.

What is claimed is:

1. A vehicle brake pad that is flexible, curved and concave towards a rotating disc, wherein said pad will contact said disc solely on the outer ends of the pad's curved body, producing a gap between the pad and the disc in a first braking position and through the pad's flexibility will act as a conventional brake pad in a second position when it is flexed flat and in full contact against said disc by movement of a piston caliper when a braking action is commanded thus increasing the area of continuous contact, said brake pad will flex back to its original concave shape when a braking action is not commanded.

* * * * *